United States Patent
Shikata et al.

[11] Patent Number: 5,868,475
[45] Date of Patent: Feb. 9, 1999

[54] AUDIOVISUAL EQUIPMENT AND CASING THEREOF AND METHOD OF PRODUCING THE SAME

[75] Inventors: Naohiro Shikata, Toyono-gun; Tomio Shiota, Takatsuki; Kaoru Shimizu, Osaka, all of Japan

[73] Assignee: Matsushita Electric Industrial Co., Ltd., Osaka, Japan

[21] Appl. No.: 854,364

[22] Filed: May 12, 1997

Related U.S. Application Data

[63] Continuation of Ser. No. 200,734, Feb. 23, 1994, abandoned.

[30] Foreign Application Priority Data

Mar. 5, 1993 [JP] Japan ................................. 5-044735

[51] Int. Cl.$^6$ .................................................. A47B 81/06
[52] U.S. Cl. ............................ 312/7.2; 381/333; 181/199
[58] Field of Search .................................. 312/7.2, 8.16; 181/148, 155, 156, 199, 196, 267; 454/184, 194, 906; 84/DIG. 26, DIG. 17; 381/88, 89, 291, 333

[56] References Cited

U.S. PATENT DOCUMENTS

| | | | |
|---|---|---|---|
| 3,422,358 | 1/1969 | Sabonis | 312/7.1 |
| 3,541,452 | 11/1970 | Disesa et al. | 312/7.1 |
| 4,395,079 | 7/1983 | Yano et al. | |
| 4,692,942 | 9/1987 | Morgand | 381/88 |
| 4,919,227 | 4/1990 | Chicoine | |

FOREIGN PATENT DOCUMENTS

| | | | |
|---|---|---|---|
| 2312907 | 7/1976 | France | 381/87 |
| 3431005 | 3/1986 | Germany | 181/199 |
| 56-108681 | 8/1981 | Japan. | |
| 56-116794 | 9/1981 | Japan. | |
| 57-66584 | 4/1982 | Japan. | |
| 63-80114 | 5/1988 | Japan. | |
| 793193 | 4/1958 | United Kingdom | 181/156 |
| 2249454 | 5/1992 | United Kingdom. | |

*Primary Examiner*—Peter M. Cuomo
*Assistant Examiner*—Gerald A. Anderson
*Attorney, Agent, or Firm*—Stevens, Davis, Miller & Mosher, L.L.P.

[57] ABSTRACT

A casing for an audiovisual equipment presents outer appearance giving the impression of integrating a hole area formed of a plurality of sound transmitting fine holes with the casing, thereby making the hole area unnoticeable. This allows a viewer to easily concentrate on the screen by eliminating anything noticeable and distracting from the area surrounding the screen, and also gives the outside of the casing a luxurious appearance. In order to make the hole area unnoticeable, maintain good volume and quality of sound from the speaker, and arrange the diameter ⌀d mm of the tapered fine holes to be practically the smallest, the relationship between the diameter ⌀d mm and the thickness T mm of the casing must be expressed by the following formula: (⅙)×T mm ≦ ⌀d mm ≈0.5 mm. When the fine holes are formed to be straight, the relationship between the diameter ⌀ds mm and the thickness t mm of the casing must be expressed by the following formula: (⅕)×t mm ≦ ⌀ds mm ≦ 0.5 mm.

4 Claims, 7 Drawing Sheets

AUDIOVISUAL EQUIPMENT AND CASING THEREOF AND METHOD OF PRODUCING THE SAME

This application is a continuation of application Ser. No. 08/200,734, filed Feb. 23, 1994 (abandoned).

BACKGROUND OF THE INVENTION

1. Field of the Invention

The present invention relates to a casing (cabinet) for audiovisual equipment which casing has holes through which sound is transmitted to the exterior of the equipment from a built-in speaker, and also to a method of producing the same.

2. Description of the Related Art

Presently, in television receivers having built-in speakers, many attempts are made to make the area comprising numerous sound transmitting holes (hereinafter simply referred to as "the hole area") less noticeable in order to present an attractive outer appearance which gives the impression of integrating the hole area with the casing. The objects of such attempts are to allow a viewer to easily concentrate on the screen by eliminating anything noticeable from the area surrounding the screen and to give the outside of the casing a luxurious appearance. In addition to these objects, another object of the present invention is to omit a fractionating process for recycling audiovisual equipment.

Figure 10A:
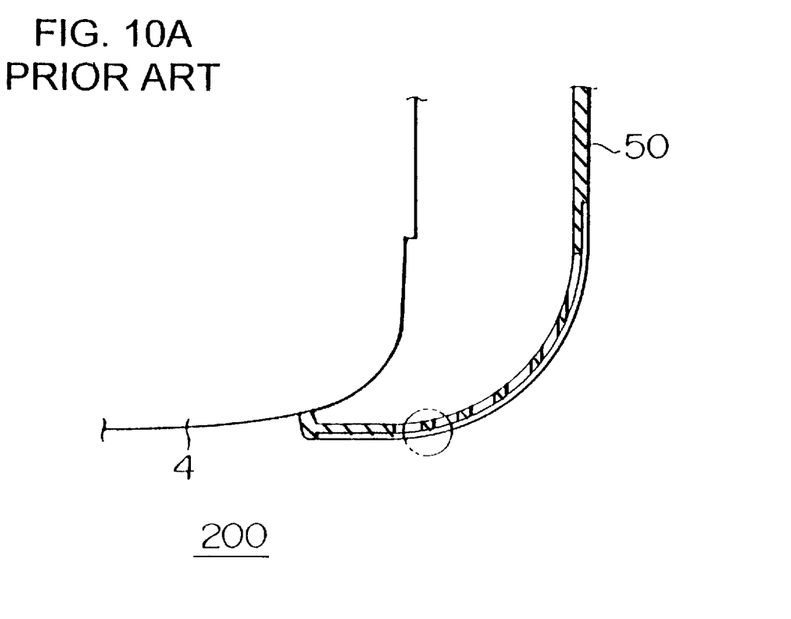
FIG. 10 is a sectional view of an essential portion of a conventional television receiver.
Figure 10B:
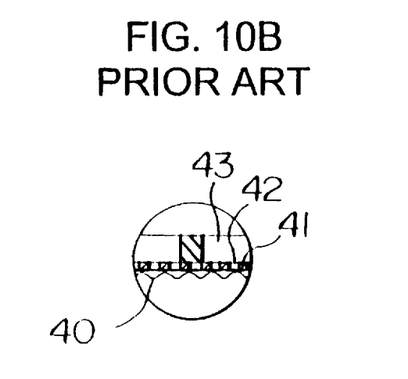
Figure 10C:
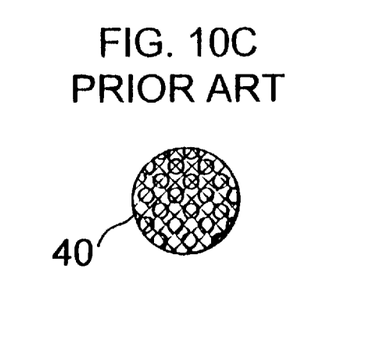

FIG. 10 shows one example of conventional hole areas which are constructed as follows. A speaker net 40 having good air permeability adheres to a punching sheet 41 having numerous holes 42 with a diameter of greater than 0.5 mm. The resultant member is attached onto a plurality of sound transmitting holes 43 having a diameter of approximately 3 mm, which holes are arranged on the front or side surface of a casing (cabinet) 50 of the television receiver.

However, the above construction presents the following problems. Since the speaker net 40 cannot be formed of the same resin material as the casing, but must be formed of a fiber material or a metal gauze, it must be separated and fractionated when the audiovisual equipment is recycled. Moreover, the fibrous speaker net is expensive, and also, a considerable amount of time is required for attaching the speaker net to the punching sheet and the casing.

In small audiovisual equipment which is directly provided with numerous sound transmitting holes for a cabinet, the diameter of the holes is large relative to the thickness of the casing. For example, the holes have a diameter of approximately from 1 mm to 2 mm relative to the casing having a thickness from 0.5 mm to 1.6 mm. Thus, the sound transmitting holes forming the hole area are obviously noticeable and conspicuous in terms of the outer appearance.

Even in a large casing, such as a television receiver, no attempts have been made to decrease the diameter of the holes until they become substantially unnoticeable.

One of the reasons for this is described as follows. According to the conventional technique, it is believed that the diameter øD mm of the mass-producible holes must be the same or larger than the thickness T mm of the casing. Consequently, if it is desired that the diameter of a plurality of holes forming the hole area be decreased until they become unnoticeable in terms of the outer appearance, the thickness of the casing must be decreased in accordance with the diameter of the holes, thus failing to ensure the physical strength of the casing.

Another reason is described as follows. It is easily inferred that it will be difficult to technically arrange such numerous unnoticeable fine holes so as to form a hole area, and thus only very low productivity can be achieved.

SUMMARY OF THE INVENTION

Accordingly, an object of the present invention is to provide a casing (cabinet) which presents a good appearance without requiring a conventionally-used speaker net and punching sheet by forming a hole area comprising unnoticeable fine sound transmitting holes.

The casing for audiovisual equipment according to the present invention comprises numerous sound transmitting holes having a diameter of 0.5 mm or less, which diameter is smaller than the thickness of the surface of the casing, so that the hole area is substantially unnoticeable.

A casing according to a first embodiment of the present invention is constructed by one-shot molding. More specifically, the casing and a hole area comprising numerous sound transmitting fine holes are integrally injection-molded. Thus, the numerous holes are arranged on at least one of the surfaces of the casing so that the hole area can be formed thereon. The fine holes have a diameter smaller than the thickness of the surface.

A casing according to a second embodiment of the present invention is constructed by double-shot molding. More specifically, the casing is primarily molded by the injection molding method, and then, the hole area comprising numerous sound transmitting holes are secondarily molded. Thus, the numerous holes are arranged on at least one of the surfaces of the casing so that the hole area can be formed thereon. The holes have a diameter smaller than the thickness of the surface of the casing.

A casing according to a third embodiment of the present invention is constructed by insert molding. A sheet which includes a hole area comprising numerous sound transmitting holes is placed in the mold in advance. Such holes have a diameter smaller than the thickness of the sheet and the surface of the casing.

Then, the casing is injection-molded. Thus, the numerous fine holes are arranged on at least one of the surfaces of the casing so that the hole area can be formed thereon.

A casing according to a fourth embodiment of the present invention is constructed as follows. A sheet which includes a hole area comprising numerous sound transmitting holes is stuck to the front and side surfaces of the casing including a plurality of holes with a diameter of approximately 3 mm. The sound transmitting holes arranged on the sheet have a diameter which is smaller than the thickness of the sheet and the surface of the casing. Thus, the numerous fine holes are arranged on at least one of the surfaces of the casing so that the hole area can be formed thereon.

A casing according to a fifth embodiment of the present invention is constructed as follows. The casing is first injection-molded. A plurality of sound transmitting fine holes are produced on the casing by numerical controlling (NC control) means using one of a drilling machine, a machining center, a laser machine, a punch press, a water jet, and electron beams. Thus, the numerous fine holes are arranged on at least one of the surfaces of the casing so that the hole area can be formed thereon. The holes have a diameter smaller than the thickness of the surface of the casing.

DESCRIPTION OF THE PREFERRED EMBODIMENTS

First Embodiment

FIGS. 1–6 show a television receiver 100A and an area comprising holes through which sound is transmitted according to a first embodiment of the present invention. The television receiver 100A includes a predetermined electronic circuit substrate 20 and also accommodates a CRT (cathode-ray tube) 4, a speaker body 2 and a speaker box 3 within a casing 1A.

Figures 1A, 1B:
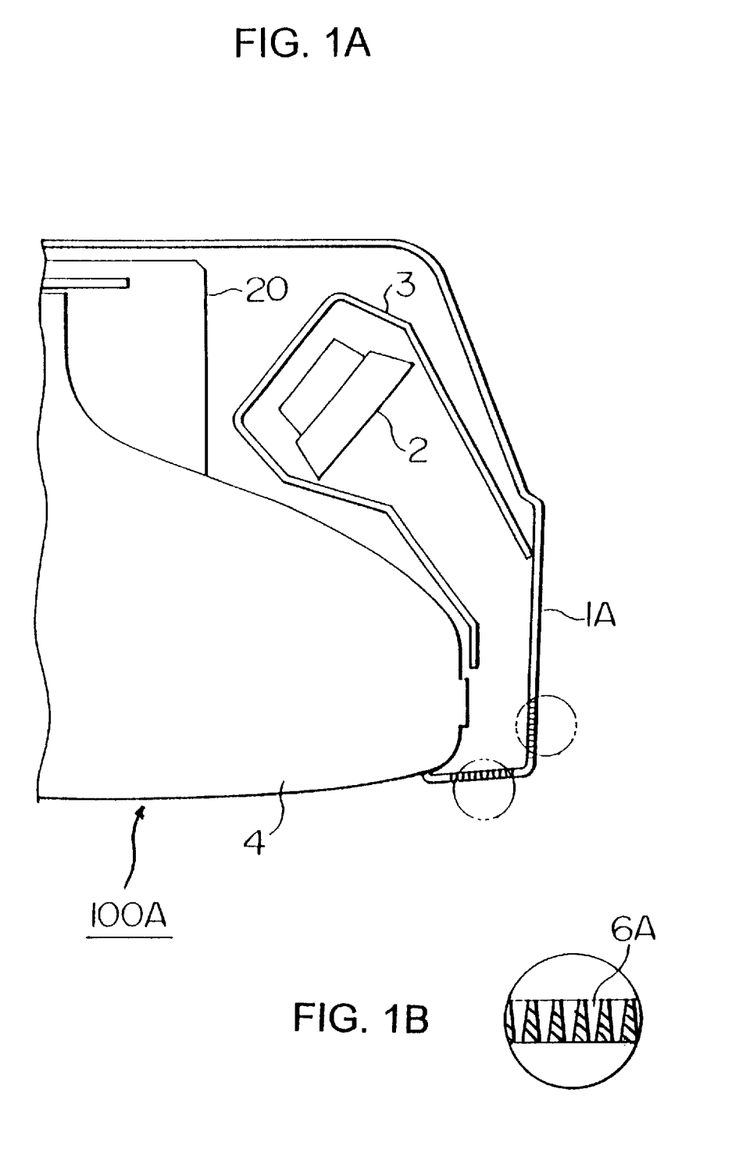
FIG. 1 is a sectional view of an essential portion of a television receiver according to a first embodiment of the present invention.
Figure 2A:
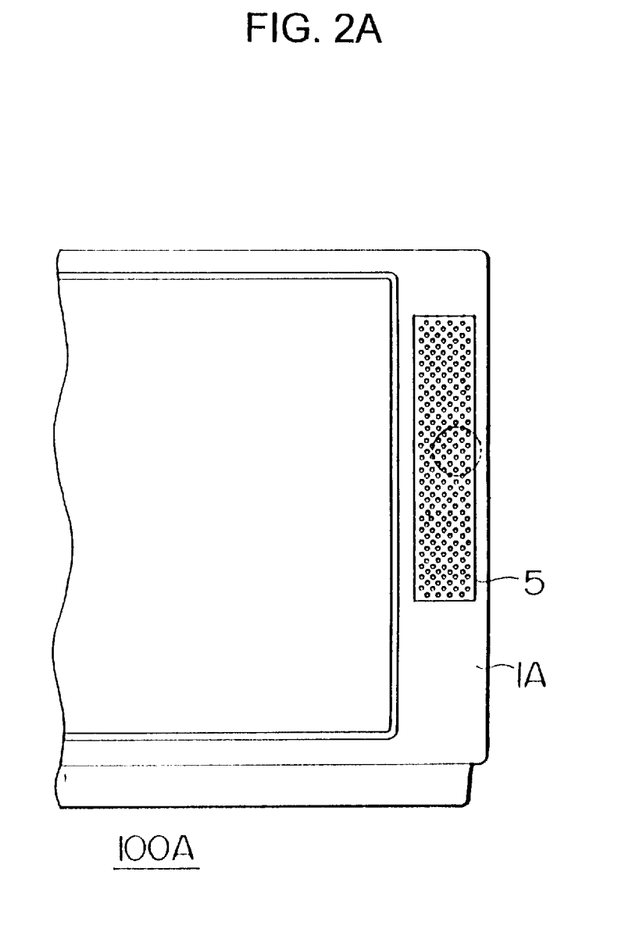
FIG. 2 is a front view of an essential portion of a television receiver according to the first embodiment of the present invention.
Figure 2B:
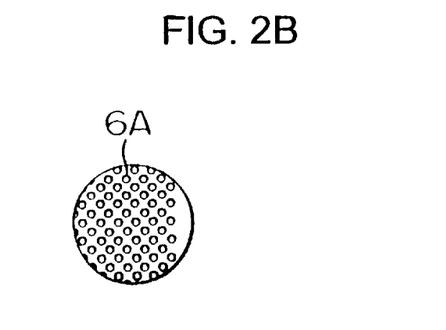

The casing 1A can be produced by injection-molding a resin member, for example, polystyrene (PS). The casing 1A is provided with a sound transmitting hole area 5 comprising a plurality of sound transmitting holes 6A on at least one of the surfaces, for example, the front surface (the surface facing viewers) and a side surface as shown in FIGS. 1 and 2. The sound transmitting fine holes 6A have a diameter of less than the thickness of the surfaces of the casing, for example, 1.6 mm.

Figure 3:
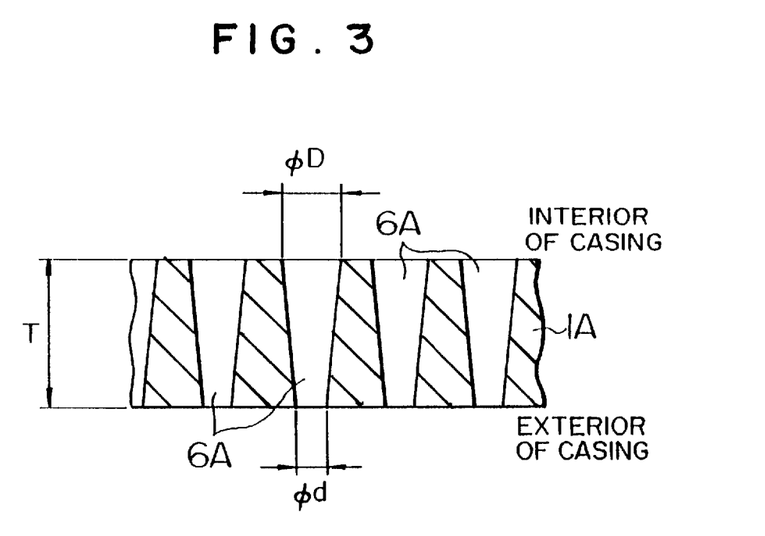
FIG. 3 is an enlarged sectional view of an essential portion of fine holes according to the first embodiment of the present invention.

As illustrated in FIG. 3, the sound transmitting fine holes 6A are formed to be tapered such that they have a greater diameter ØD adjacent to the interior of the casing 1A and a smaller diameter Ød adjacent to the exterior of the casing 1A, and are produced by one-shot molding integrally with the casing 1A according to the injection molding method as stated above.

Many patterns are available to arrange the plurality of sound transmitting fine holes 6A. For example, they may be arranged in a plurality of rows and columns as shown in FIG. 5, or may be arranged concentrically as illustrated in FIG. 6.

Figure 5:
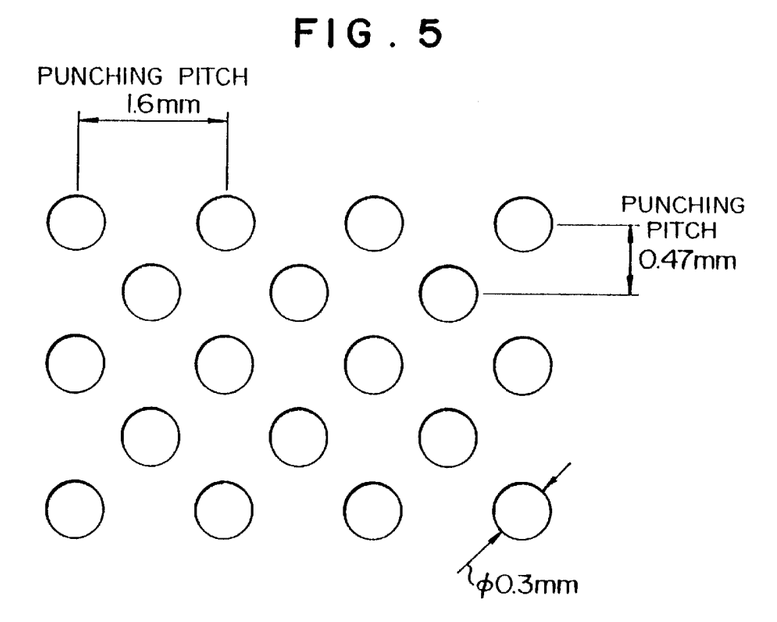
FIG. 5 is a front view of an essential portion showing one arrangement for the fine holes according to the first embodiment of the present invention.
Figure 6:
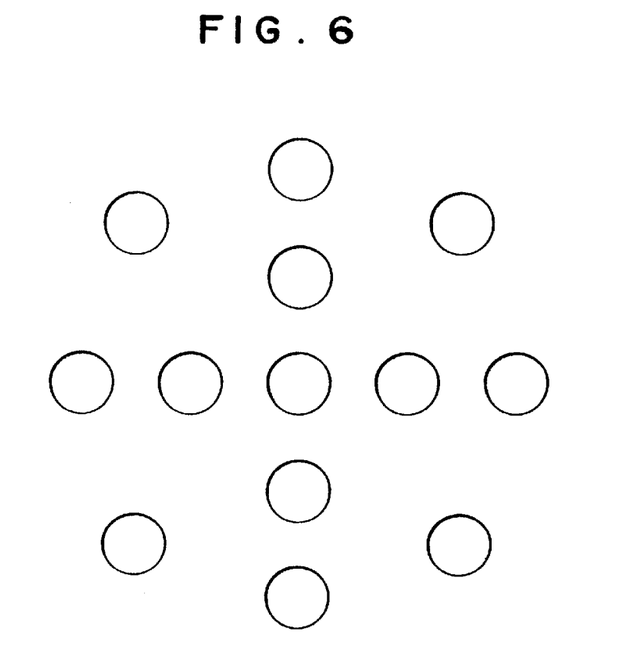
FIG. 6 is a front view of an essential portion showing another arrangement for the fine holes according to the first embodiment of the present invention.

In this embodiment, the inventors examined the diameter of the sound transmitting fine holes 6A and the pitch arrangement of the holes (hereinafter simply referred to as "the pitch") when the hole area is formed by arranging the sound transmitting holes 6A in a plurality of rows and columns as shown in FIG. 5. The diameter of the sound transmitting holes 6A was arranged to be 0.3 mm, because as a result of examination, it was found that the hole area provided for commonly-used dark-colored casings was not noticeable if the diameter of the holes was 0.5 mm or less. A casing having a plurality of such sound transmitting fine holes, approximately 40,000 for a television receiver, can be mass-produced. This is because the following production technique is available. An injection mold having a plurality of elongated pins is produced with high precision, and then, resin molding is performed at low pressure. The smaller diameter of the sound transmitting holes advantageously makes the hole area less noticeable. However, the smaller the diameter, the less effective such an advantage. That is, the effect gained by making the area even less noticeable is very little. Also, if the diameter of the sound transmitting holes is made smaller, more holes are required in order to maintain good volume and quality of sound from the speaker. That is, it is necessary to have more numerous narrower pins within the injection mold. This accordingly requires an injection mold with higher precision and a more advanced production technique, thus inevitably resulting in an increase in the cost.

Therefore, the smallest practical diameter of the sound transmitting holes must be determined so as to balance the advantages gained by making the diameter small and the disadvantages caused by the increased cost required for such a purpose.

The diameter Ød mm of the sound transmitting holes 6A must be the smallest practical size to such a degree that the hole area is not noticeable and that good volume and quality of sound from the speaker can be maintained. As a result of the inventor's examination, the relationship between the thickness T mm of the casing 1A and the diameter Ødmm of the holes may be expressed as follows:

$$(1/6) \times T \text{ mm} \leq \text{Ød mm} \leq 0.5 \text{ mm}$$

In this embodiment, the diameter of the sound transmitting holes and the pitch therebetween were determined as follows. As shown in FIGS. 3 and 5, the diameter Ød of the holes adjacent to the exterior of the casing 1A was 0.3 mm; the diameter ØD of the holes adjacent to the interior of the casing 1A was 0.6 mm; the pitch to arrange the holes in the horizontal direction (hereinafter simply referred to as "the horizontal pitch") was 1.6 mm; the pitch to arrange the holes in the vertical direction (hereinafter simply referred to as "the vertical pitch") was 0.47 mm.

Figure 4:
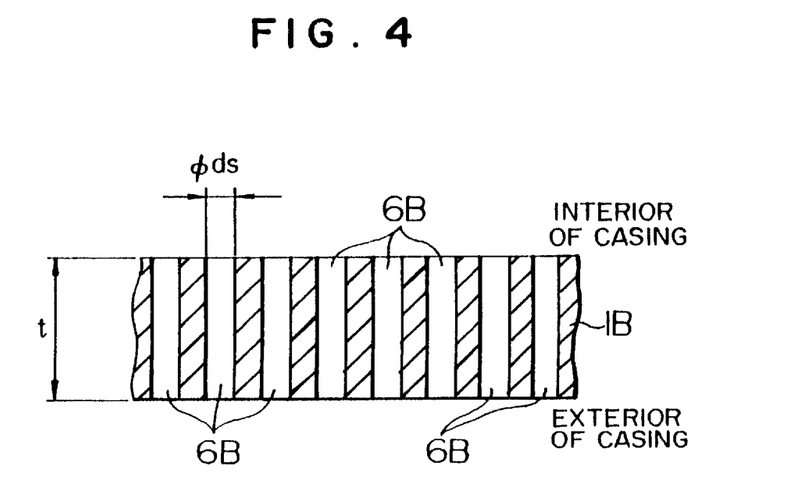
FIG. 4 is an enlarged sectional view of an essential portion of another type of fine holes according to the first embodiment of the present invention.

If the sound transmitting holes are constructed of straight holes 6B shown in FIG. 4 instead of tapered holes, the relationship between the thickness t mm of the casing 1A and the diameter Øds mm of the sound transmitting holes 6B may be expressed as follows:

$$(1/5) \times t \text{ mm} \leq \text{Øds mm} \leq 0.5 \text{ mm}$$

1/6 in the previous expression is replaced by 1/5 in this expression because pins within an injection mold for straight holes must be smaller than the pins for making tapered holes. In this embodiment, when t was 1.6 mm, ds was arranged to be 0.36 mm. The horizontal and vertical pitches were arranged as the same or slightly smaller than those of the tapered holes. The sound transmitting holes 6B are integrally produced by one-shot molding with the casing according to the injection molding method in a manner similar to those of tapered holes.

It is more difficult to release the product from the mold when the fine holes 6B are formed to be straight than when the fine holes 6A are formed to be tapered, and the strength of the pins within the mold for forming the fine holes 6B is lowered. Thus, the diameter of the sound transmitting holes was arranged to be ø0.36 mm.

The shape of the sound transmitting holes is not limited to a circle, but may be a polygon having a diagonal line smaller than the thickness of the casing, or an oval or an ellipse having a maximum chord smaller than the thickness of the casing.

Also, the position on which the sound transmitting holes are arranged is not limited to the front and side surfaces of the casing, but may be placed on a desired position, for example, on the top or bottom surfaces, or curved surfaces at the corner of the casing.

In the first embodiment of the present invention, since a speaker net and a punching sheet are not used, an adhering operation can be omitted and the hole area 5 can be produced simultaneously with molding the casing 1A according to the one-shot molding method, thus resulting in higher productivity than the conventional construction.

Second Embodiment

Figure 7:
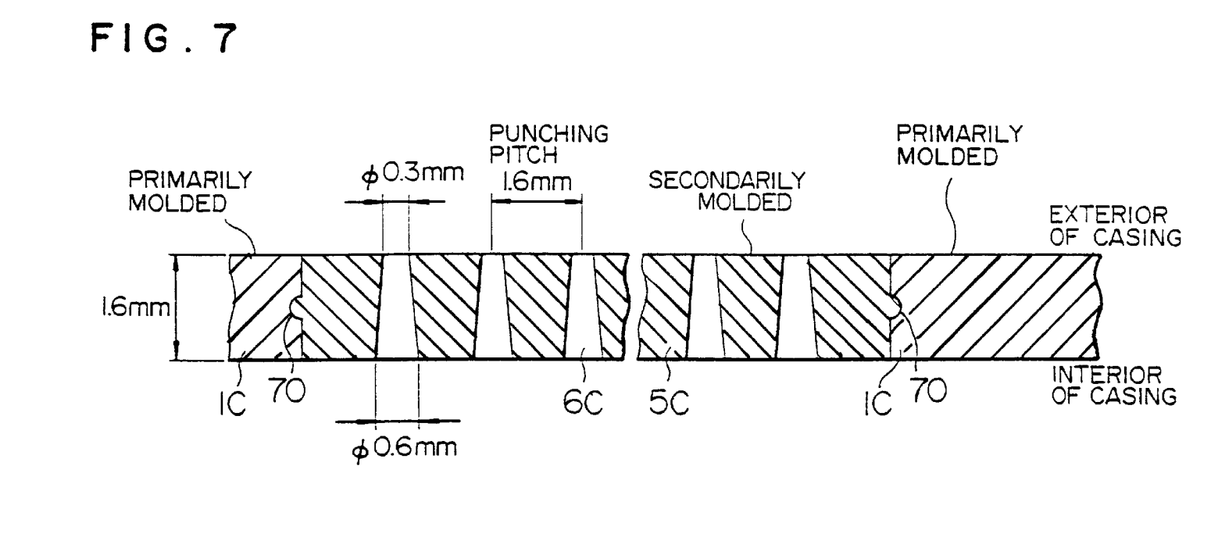
FIG. 7 is an enlarged sectional view of an essential portion of a hole area and fine holes according to a second embodiment of the present invention.
Figure 8:
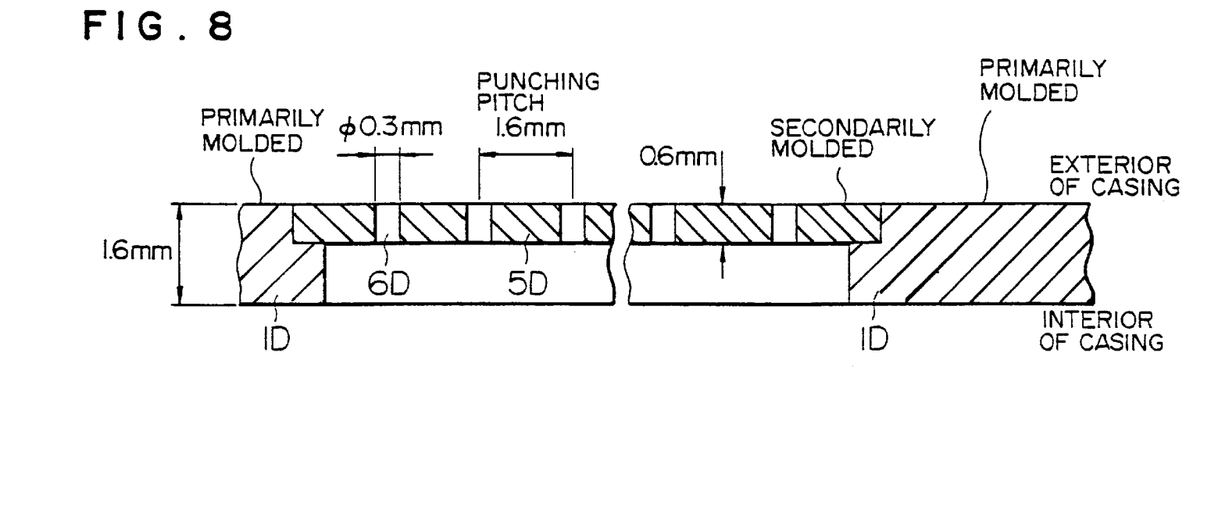
FIG. 8 is an enlarged sectional view of an essential portion of another type of hole area and fine holes according to the second embodiment of the present invention.

The second embodiment differs from the first embodiment in the method of molding the hole area arranged on the surface of the casing. More specifically, the casing is primarily molded according to the injection molding method, and then, the mold is moved or turned so as to secondarily mold the hole area. This is called a double-shot molding method. Since the hole area is secondarily molded, the mold can be constructed simply, and also, the type of material forming the hole area produced by the secondarily molding can be varied. FIGS. 7 and 8 are sectional views of essential portions of the casing and the hole area formed by double-shot molding.

Referring to FIG. 7, the thickness of the casing 1C formed by the primary molding is equal to that of the hole area 5C formed by the secondary molding, and the sound transmitting fine holes 6C are tapered. The thickness of the casing, the diameter and the vertical and horizontal pitches of the holes are the same as those in the first embodiment. Further, projected and recessed portions 70 are formed in the central area along the thickness of the casing in order to avoid the separation of the casing 1C and the hole area 5C.

Referring to FIG. 8, the thickness of the casing 1D formed by the primary molding differs from that of the hole area 5D formed by the secondary molding, and the sound transmitting fine holes 6D are made straight. More specifically, the thickness of the hole area 5D is arranged to be one half or less than that of the casing 1D, thereby simplifying the formation of the holes 6D. The thickness of the casing, the diameter and the vertical and horizontal pitches of the holes are the same as those in the first embodiment.

In the second embodiment shown in FIG. 8, the thickness of the hole area 5D was arranged to be 0.6 mm; the diameter of the straight holes was arranged to be 0.3 mm; the horizontal and vertical pitches of the holes were arranged to be 1.6 mm and 0.47 mm, respectively.

In the second embodiment, the type of material forming the casings 1C and 1D and that of the hole areas 5C and 5D can be varied according to necessity.

Third Embodiment

A third embodiment employs the insert molding method, a different method of molding the casing and the hole area from the first embodiment.

More specifically, a sheet including sound transmitting fine holes having a diameter smaller than the thickness of the sheet is placed in the mold in advance, and then, a material forming the casing is injection-molded. In the third embodiment, the thickness of the sheet was arranged to be, for example, from 0.4 mm to 0.5 mm, and the diameter of the fine holes formed to be straight was arranged to be 0.3 mm (not shown).

The sheet with the fine holes is formed of a different material and in a different process from the casing. For example, the casing is formed by injection-molding a resin material, such as PS, and the sheet is formed of a resin film comprising PS, polyester, or the like. Because of this, the hole area can be produced more easily than that in the second embodiment. Needless to say, the sound transmitting holes may be formed to be tapered.

Further, the third embodiment is easily adaptable for various modifications and situations, such as a variation in the arrangement of the sound transmitting holes, frequent changes in the type of television receivers and an extremely small number of lots comprising one type of apparatus.

The sound transmitting holes are provided for the sheet according to one of various methods. For example, a PS resin film sheet formed of a hoop material (band-like winding material) is produced by numerical controlling (NC control) means using one of a drilling machine, a machining center, a laser machine, a punch press, a water jet, and electron beams.

Fourth Embodiment

In a fourth embodiment of the present invention, a sheet produced in a different process from the casing is attached to at least one of the surfaces of the casing.

Figure 9A:
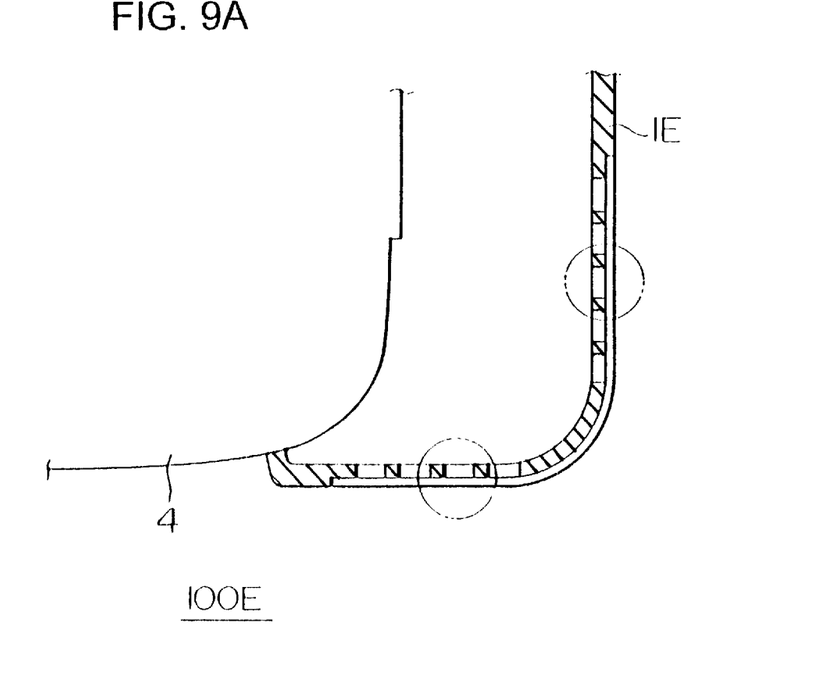
FIG. 9 is a sectional view of an essential portion of a television receiver according to a fourth embodiment of the present invention.
Figure 9B:
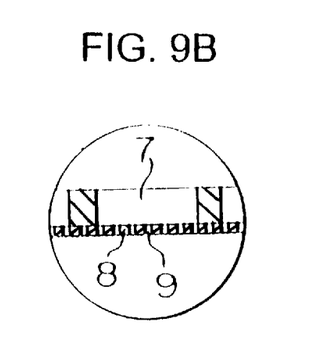

More specifically, as shown in FIG. 9, the sheet 8 which forms a hole area by providing sound transmitting holes 9 and the casing 1E are produced separately, and the sheet 8 is attached to the front or side surface of the casing 1E. The casing 1E is provided with a plurality of cabinet sound holes 7 in a predetermined area which holes have a rectangular size of 3 mm or a diameter of approximately ø3 mm. The sound transmitting holes forming the hole area as stated above must satisfy the following conditions according to the shape of the holes: the circular holes must have a diameter smaller than the thickness of the sheet; the polygonal holes must have a diagonal line smaller than the thickness of the sheet; the oval or elliptic holes must have a maximum chord smaller than the thickness of the sheet.

In this embodiment of the present invention, the sheet 8 was formed of, for example, a PS resin film having a thickness from 0.4 mm to 0.5 mm; the sound transmitting holes 9 formed to be straight had a diameter of 0.3 mm; the vertical and horizontal pitches were equal to those in the first embodiment (not shown). Needless to say, the holes may be formed to be tapered.

It is possible to produce the sheet 8 with the sound transmitting holes formed of a different material in a different process from the casing in this fourth embodiment as well as in the third embodiment. For example, the casing 1E may be formed by injection-molding a resin material, such as PS, and the sheet 8 may be formed of other kinds of materials, such as a metal film sheet, a ceramics sheet, or a paper sheet, suitable for a recycling fractionating process. Of course, the sheet 8 can be formed of the same resin film. Because of this, the hole area can be produced more easily than that of the second embodiment, thus achieving even higher productivity. The sound transmitting holes 9 are produced according to one of various methods. For example, a PS resin film sheet formed of a hoop material is produced by numerical controlling (NC control) means using one of a drilling machine, a machining center, a laser machine, a punch press, a water jet, and electron beams.

Fifth Embodiment

In a fifth embodiment of the present invention, the sound transmitting fine holes are arranged on at least one of the surfaces of the casing so as to form the hole area. The holes have a diameter smaller than the thickness of the surface of the casing. The sound transmitting holes are punched on the injection-molded casing in a different process from the casing by such means as machining or electronic energy.

The casing without a hole area is first formed by injection-molding a PS resin. Then, a plurality of sound transmitting holes are punched on at least one of the surfaces of the casing so as to form the hole area. The sound transmitting holes must satisfy the following conditions according to the shape of the holes: the circular holes must have a diameter smaller than the thickness of the sheet; the polygonal holes must have a diagonal line smaller than the thickness of the sheet; the oval or elliptic holes must have a maximum chord smaller than the thickness of the sheet.

The holes are punched by numerical controlling means using one of a drilling machine, a machining center, a laser machine, a punch press, a water jet, and electronic beams (not shown).

A mold may be constructed in a manner similar to that of a mold for forming a conventional casing. The fifth embodiment is easily adaptable for various modifications and situations, such as a variation in the arrangement of the sound transmitting holes, frequent changes in the type of television receivers and an extremely small number of lots comprising one type of apparatus.

What is claimed is:

1. A casing for audiovisual equipment, said casing being formed of an injection molded resin member and comprising a sound transmitting hole area, having a plurality of fine through holes, on at least one surface of said casing, said surface of said casing having a thickness of 0.5 mm or more, said holes having a center axis that is substantially perpendicular to said surface of said casing and having one of (a) a longest dimension passing through said center axis and perpendicular thereto which is smaller than a thickness of the casing at said surface, (b) a polygonal shape with a diagonal line, passing through said center axis, which is smaller than said thickness of said casing at said surface, (c) an oval shape with a longest chord, substantially perpendicular to said center axis, which is smaller than said thickness of said casing at said surface and (d) an elliptical shape with a longest chord, substantially perpendicular to said center axis, which is smaller than said thickness of said casing at said surface, said one of said longest dimension, said diagonal line, said longest chord of said oval shape and said longest chord of said elliptical shape being in a range of 0.3 mm to 0.5 mm, wherein each of said fine holes has a uniform cross section in a direction along and perpendicular to said center axis and a relationship between the thickness t of said casing at said surface and one of said longest dimension, said diagonal line, said longest chord of said oval shape and said longest chord of said elliptical shape is expressed by the formula $t \leq 5 \times$ one of said largest dimension, said diagonal line, said chord of said oval shape and said chord of said elliptical shape.

2. A casing for audiovisual equipment according to claim 1, wherein one of said largest dimension, said diagonal line, said chord of said oval share and said chord of said elliptical shape is 0.5 mm or less.

3. A casing for audiovisual equipment, said casing being formed of an injection molded resin member and comprising a sound transmitting hole area, having a plurality of fine through holes, on at least one surface of said casing, said surface of said casing having a thickness of 0.5 mm or more, said holes having a center axis that is substantially perpendicular to said surface of said casing and having one of (a) a longest dimension passing through said center axis and perpendicular thereto which is smaller than a thickness of the casing at said surface, (b) a polygonal shape with a diagonal line, passing through said center axis, which is smaller than said thickness of said casing at said surface, (c) an oval shape with a longest chord, substantially perpendicular to said center axis, which is smaller than said thickness of said casing at said surface and (d) an elliptical shape with a longest chord, substantially perpendicular to said center axis, which is smaller than said thickness of said casing at said surface, said one of said longest dimension, said diagonal line, said chord of said oval shape and said chord of said elliptical shape being in a range of 0.3 mm to 0.5 mm, wherein said holes are round and have a diameter of 0.36 mm, a pitch between said holes in a first direction is 1.6 mm and a pitch between said holes in a second direction orthogonal to said first direction is 0.47 mm.

4. Audiovisual equipment provided with a casing comprising a sound transmitting hole area, having a plurality of fine through holes, on at least one surface of said casing, said surface of said casing having a thickness of 0.5 mm or more, said holes having a center axis that is substantially perpendicular to said surface of said casing and having one of (a) a longest dimension passing through said center axis and perpendicular thereto which is smaller than a thickness of the casing at said surface, (b) a polygonal shape with a diagonal line, passing through said center axis, which is smaller than said thickness of said casing at said surface, (c) an oval shape with a longest chord, substantially perpendicular to said center axis, which is smaller than said thickness of said casing at said surface and (d) an elliptical shape with a longest chord, substantially perpendicular to said center axis, which is smaller than said thickness of said casing at said surface, said one of said longest dimension, said diagonal line, said longest chord of said oval shape and said longest chord of said elliptical shape being in a range of 0.3 mm to 0.5 mm, wherein said holes are round and have a diameter of 0.36 mm, a pitch between said holes in a first direction is 1.6 mm and a pitch between said holes in a second direction orthogonal to said first direction is 0.47 mm.

* * * * *